Patented May 19, 1936

2,040,910

UNITED STATES PATENT OFFICE 2,040,910

ABSORPTION REFRIGERATION

Glenn F. Zellhoefer, Bloomington, Ill.

No Drawing. Application May 3, 1935,
Serial No. 19,599

2 Claims. (Cl. 252—5)

The present invention relates generally to a solvent material and a refrigerant mixture for absorption refrigerating machines, both of the two-fluid type and of the three-fluid type.

In absorption refrigeration there is required a solvent material adapted to remain liquid throughout the operation of the apparatus, and a refrigerant material adapted to have a liquid and a vapor phase in the cycles of operation, adapted to be dissolved or absorbed in the solvent, adapted to be evaporated or boiled as a vapor from the solvent mixture and from the solvent, and adapted to be condensed from the vapor to a liquid. Numerous refrigerants and numerous solvents are known, as well as successful combinations of these.

The two-fluid absorption machines have certain mechanical parts which may be omitted or which are not duplicated in three-fluid machines. In a three-fluid machine, there is, in addition to the two-fluid mixture, a body of inert gas which is always gas, and which does not to any substantial extent dissolve in any of the components of the two-fluid composition, or in mixtures thereof.

The present invention is directed to a new solvent for absorption refrigeration, and to combinations thereof with refrigerants.

A particular object of the invention is the use of dimethyl ether of hexaethylene glycol as a solvent.

Another object is the use of a combination of said solvent with the refrigerant, dichloromonofluoromethane.

Examples of the two-fluid apparatus in which the new solvent material and the new combination may be used is disclosed in my co-pending application Serial No. 651,306, filed January 12, 1933, or in my U. S. Patent No. 1,895,698, issued January 31, 1933. Other examples may readily be cited, and will be known to those skilled in the art.

The two-fluid apparatus above referred to, briefly described, comprises a still in which a liquid mixture of solvent and refrigerant is heated to distill away as a vapor the refrigerant material, a condenser wherein said vapor is condensed to a liquid state, an evaporator wherein the resulting liquid is vaporized at reduced pressure to produce refrigeration, and an absorber in which vapor of the refrigerant material containing added heat units (acquired in the refrigerating process) is again dissolved in the solvent material. Suitable heat exchanging and circulating means are included, and automatic controls may be provided.

The particular characteristics of such a machine are that the still operates at temperatures well above normal temperatures, such for example at 210° F. to 250° F.; and that the cooling unit operates at temperatures lower than normal, such as from 15° F. to 50° F. Various parts of the apparatus differ in the prevailing temperatures and pressures, and both pressure and temperature determine the physical state of the free refrigerant material, whether gaseous or liquid, and determine the solubility relations between the refrigerant and the solvent material. It is, therefore, very important that the solvent and the refrigerant materials be physically adapted for use as individual materials in certain places and for certain functions, and that they be mutually adapted for certain functions when they are in combination. Other qualities not essential to refrigeration, but pertinent to practical usage, control or limit the choice of solvent or refrigerant, such as odor, viscosity, heat capacity, boiling point, freezing point, volatility, chemical stability, reactivity, corrosive action, inflammability, toxicity, etc.

By considering the limitations herein set forth and suggested, I have been able to utilize dimethyl ether of hexaethylene glycol as a solvent, for practical usage, in combination with the refrigerant, dichloromonofluoromethane, which is little known.

The new solvent is herein named as dimethyl ether of hexaethylene glycol. In order to leave no doubt as to its identity, its structural formula, is herein given:

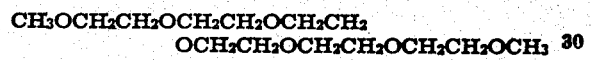

The refrigerant herein specified is dichloromonofluoromethane. In order to leave no doubt as to its identity, its structural formula is herein given: 

In the accompanying claims, the invention is set forth as a combination useful in absorption refrigeration. It is to be understood that a simple adulteration of the new solvent in its pure form, either by reason of commercial impurities, or by addition of lesser quantities of other material, useful also as solvent, is permitted, and such a composition is intended to fall within the scope of the present invention.

What I claim is:

The solvent herein specifically claimed is covered generically in applicant's copending application Serial No. 17,064, filed April 18, 1935.

1. A refrigerant mixture for the absorption type of refrigeration apparatus consisting of dimethyl ether of hexaethylene glycol as the essentially predominant solvent, and dichloromonofluoromethane as a refrigerant.

2. A refrigerant mixture for the absorption type of refrigeration apparatus consisting of dimethyl ether of hexaethylene glycol as the essentially predominant solvent, and a volatile chemically stable halogenated hydrocarbon refrigerant soluble in said solvent.

GLENN F. ZELLHOEFER.